March 15, 1938.  W. S. MASON  2,111,291
PISTON RING
Filed Nov. 25, 1936
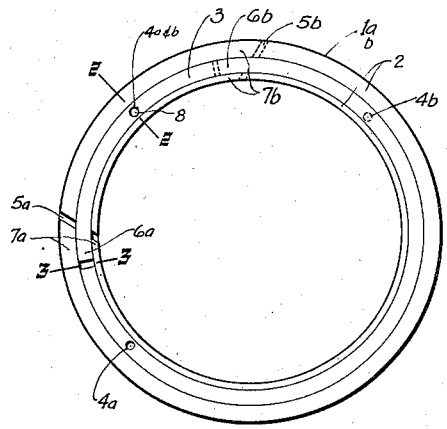
Fig 1
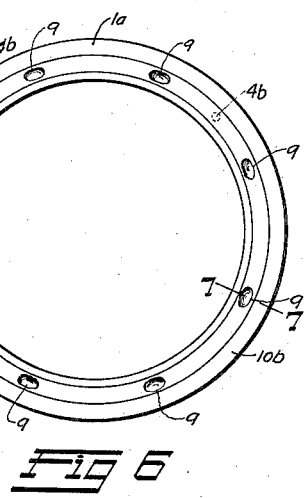
Fig 4
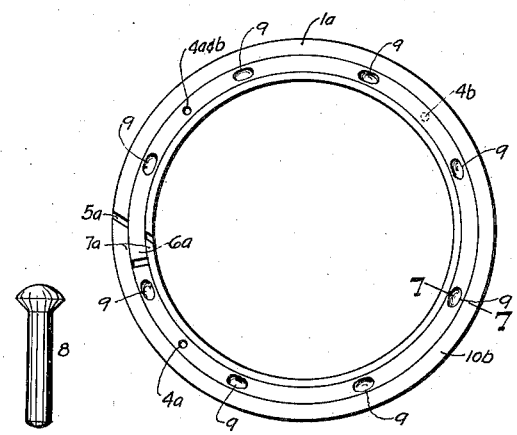
Fig 6
Fig 2
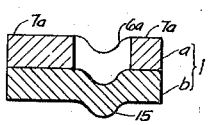
Fig 3
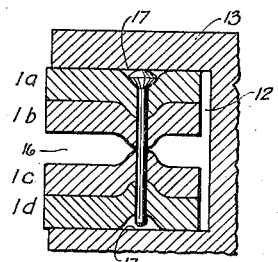
Fig 5
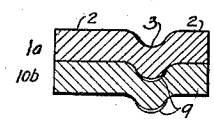
Fig 7
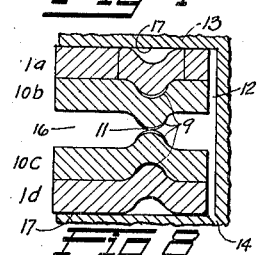
Fig 8
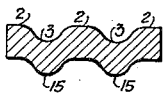
Fig 9
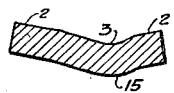
Fig 11
Fig 10
Inventor
William S. Mason Patented Mar. 15, 1938

2,111,291

UNITED STATES PATENT OFFICE 2,111,291

PISTON RING

William S. Mason, Ocean Beach, Calif.

Application November 25, 1936, Serial No. 112,725

12 Claims. (Cl. 309—24)

This invention relates to metal packing rings for use in the cylinders of internal combustion engines, and more especially to laminated packings wherein a plurality of axially and radially expansible split rings are used in the same recess of a piston.

The primary object of a packing is to form a substantially hermetic seal between the piston and the wall of the cylinder. To accomplish this object it is necessary for the packing to seat firmly on the side walls of the recess in the piston at all times and due to the distortion of the recess caused by wear and temperature changes, it is essential that the packing be axially as well as radially expanding to prevent leakage between the packing and the side walls of the recess in the piston. Much of the wear at the points of contact between the packing and the side walls of the recess is due to the rocking motion of the piston in the cylinder which increases with cylinder and piston wear. To decrease this wear it is desirable that an axially expansible packing maintain a film of oil to lubricate the side walls of the recess to prevent excessive wear of the rings and the side walls of the recess at the points of contact. A further advantage of an oil film between sealing surfaces is that it requires less ring pressure to prevent leakage. This lower pressure permits freer radial expansion of the ring so it can conform to cylinder irregularities, and this is especially important in modern high speed internal combustion engines.

An important object is to provide a packing in which wear on the periphery of the rings has little effect upon the axial pressure of the rings on the side walls of the recess.

Another important object is to provide a packing of the class described in which the radial rigidity of the rings is increased without increasing the weight or size of the packing.

A still further important object is to provide a packing formed and arranged to maintain a film of oil between the cylinder wall and the body of the packing. This is especially important for a packing used in the upper recess of the piston which gets hotter, and in the conventional type of internal combustion engine gets less oil than recesses lower in the piston, and when a film of oil is maintained in the body of the packing less radial pressure is required to prevent leakage between the packing and the wall of the cylinder. This will also decrease wear and reduce ring drag.

Another object is to provide means for the packing which will maintain the spaced arrangement of the rings and prevent the gaps of adjoining rings from lining up.

A further object is to provide a packing of the class described in which the rings are formed and arranged to prevent leakage at the joints of the rings.

A still further object is to provide a packing in which the rings coact to give the packing a more uniform radial pressure on the cylinder walls.

An additional object is to provide a packing which will permit free oil drainage between the wall of the cylinder and the drain duct in the recess of the piston.

Other objects and advantages of the present invention will appear in the specification and claims below.

Referring to the drawing forming a part of this specification, and in which like reference characters are employed to designate like parts:

Figure 1 is a top view of a group of rings constructed in accordance with my invention, Figure 2 is a section on the line 2—2 of Figure 1, Figure 3 is a section on the line 3—3 of Figure 1, Figure 4 is an enlarged view of the pin shown in Figures 1, 2 and 3, Figure 5 is a section of a packing and shows two superimposed groups of rings arranged within the recess of a piston.

Figure 6 is a top view of a group of rings, the lower ring being of modified form, Figure 7 is a section on the line 7—7 of Figure 6, Figure 8 is a section of a packing showing two superimposed groups of rings arranged within the recess of a piston, the inner rings of the groups being of modified form, and Figures 9, 10, and 11 are sectional views of further modifications.

For clearness and to simplify the description and claims the term packing is used in place of laminated packing ring or piston ring; the term recess is used instead of packing ring groove, and the term ring is used to designate the laminations or ring members of the packing.

Referring to Figure 1 of the drawing, there is illustrated a top view of two rings having annularly corrugated sides, the rings being superimposed to form a group. Numeral 1 indicates the rings. The letter "a" the top ring and "b" the lower ring of the group. The lands or original flat surface of the rings is indicated by the numeral 2 and the groove by the numeral 3. The rings are provided with slots, 4, which extend entirely through the sides of the rings and are preferably located at 45 degrees from the joints or gaps, 5, of the rings so that the joints can be spaced at 90 degrees as illustrated. A pin, 8, extends through one slot in each ring to maintain the spaced arrangement of the joints. The joints of the rings are formed by parallel annularly extending tongues, indicated by the numeral 7, in one end of the ring, forming a groove the sides of which overlap in a radial direction, an axially compressible tongue, 6, in the other end of the ring.

With reference to Figure 1, some of the advantages are as follows: The rings are arranged in a group with ridges and grooves of adjoining rings complementary, so that the rings within the group will have supplementary radial expansion, and the gaps of the adjoining rings are spaced at right angles so that the expansion of the group will be more uniform than that of an individual ring. The rings, being pinned, this spaced joint arrangement is maintained and leakage between the joints and the cylinder wall is prevented by the sides of one ring overlapping the joint of the adjoining ring of the group.

In Figure 2, which is a section on the line 2—2 of Figure 1 this pinned arrangement of the rings is more plainly illustrated as is the ridge or opposite side of the groove indicated by the numeral 15.

A preferred type of joint is shown in Figure 3, which is an enlarged section on the line 3—3 of Figure 1. Axially compressible tongue 6a is overlapped in a radial direction by the tongues 7a and laterally by the side of the adjoining ring so that the groove 3 forms a continuous sealed channel when several groups are arranged within the recess of a piston as illustrated in Figure 5, which shows two groups of rings arranged within recess 12 of piston 13. The lands of rings adjacent to side walls 17 are in firm contact therewith and the clearance between the bottom of the groove and the adjoining side walls of the recess forms a continuous sealed annularly extending channel, which serves as an oil reservoir, collecting oil during periods when there is an excess, as during the idling period of the motor, to be utilized during periods of motor operation when the supply of oil is insufficient. Another continuous annular channel, indicated by numeral 16, is formed between the groups of rings when they are arranged as illustrated in Figure 5. The ridges of adjoining rings of the groups are in contact so that an oil reservoir is formed between the cylinder wall and the ridges of the rings. The action of both reservoirs being the same, they have the same advantages, some of which are;—less pressure is required to prevent the burning gases in the combustion chamber from passing between contacting surfaces which are lubricated, and ring drag is reduced on the wall of the cylinder and the side walls of the recess in the piston.

Still referring to Figure 5, the head of the pin is shown in firm contact with the side wall of the recess. This is so that the beveled surface between the head and the body of the pin will be in firm contact with the slot in the adjoining ring to prevent oil from leaking out of the groove of the ring in which the head of the pin seats. The body of the pin extends through one slot in each ring to prevent relative creeping movement between rings of the packing.

Figure 4 shows an enlarged view of the pin.

Referring to Figure 6, the top ring, 1a, of the group is the same as the rings of Figure 1, the bottom ring, 10b, being the same with the exception that is provided with a series of indentations within the groove. These indentations, indicated by the numeral 9, deepen the groove and cause ridges of the ring to be higher at points opposite the indentation. This is more clearly shown in Figure 7, which is a section on the line 7—7 of Figure 6.

Figure 8 shows a packing comprising two groups of rings arranged within the recess of a piston. The inner rings 10b and 10c are provided with indentations, the ridges of which are the only points of contact between the groups, the spaces between the indentations forming passageways, indicated by the numeral 11, between the groups so that oil collected by channel 16 is drained through duct 14 of the piston, the duct extends from the bottom of the recess through the wall of the piston. A packing of the above type is useful in the lower recesses of the piston to prevent an excess of oil from getting into the combustion chamber.

In reference to Figures 1 to 8 inclusive, the rings are provided with a single corrugation in their sides which extends throughout the annular length of the rings. In some cases it is more desirable that a single corrugation be provided rather than several corrugations so that more of the side surface of the ring and the adjacent side wall will be in contact, forming a better heat path between the ring and the side wall of the recess in the piston. A good heat path is especially desirable for the upper ring of the packing which is nearer the combustion chamber and has some of its surface exposed to the explosion. The increased surface contact between the ring and recess reduces wear on both.

In reference to Figure 9, which is a sectional view of a ring having two corrugations in its side, each additional corrugation increases the rigidity of the ring and decreases the side wall contacting surface, this is desirable in a large size ring, or a ring used in a lower recess of a piston the increased rigidity and smaller amount of contacting surface will seal the recess and prevent an excess of oil from working by the sealing surfaces to the combustion chamber.

Figure 10 shows a section of a ring in which the side is completely corrugated, which further increases the rigidity of the ring but reduces the wall contacting surface of the ring in proportion so that its use in an internal combustion engine would be confined to a lower recess in the piston where there is an excess of oil and which is relatively cool.

Figure 11 is a section of a modified ring having a relatively shallow groove and slightly diverging lands. This modification would be preferably used as a replacement ring, for due to the divergence of the lands it would fit firmer on the periphery and seal the worn recess in the piston, and being shallow grooved the rings of the group would have freer and more independent radial expansion to fit worn cylinders.

Some additional and important advantages of the packing are: with the exception of modification shown in Figure 10, the packings seal the side walls of the recess at the periphery so that the minimum surface of the packing is exposed to the burning gases of the combustion chamber; the ends of the rings of the packing are overlapped by the side of an adjoining ring which decreases the chances of an end getting between the wall of the cylinder and the piston; distortion of the rings of the packing when the rings are compressed between the side wall of the recess is mainly confined to the groove so there is but slight loss of axial compression due to wear on the periphery of the packing.

The rings of this invention are made of, preferably, ribbon steel bent into ring shape and corrugated in the same operation. To simplify the specification only a few of the possible arrangements and modifications have been illustrated and described, for example only one slot is necessary in each ring to pin the rings if they are used in pairs.

Other changes may be made without departing from the scope of the appended claims, set forth below.

I claim:

1. In combination with a recessed piston, a packing comprising in grouped arrangement a plurality of radially and axially expansible split rings, said rings within a group having complementary ridged and grooved sides in substantially full lateral contact, said groups being superimposed with ridge contact between groups, whereby said groups have independent radial expansion and supplementary axial expansion.

2. A packing for use in the recess of a reciprocating piston, mounted in a cylinder, comprising a plurality of superimposed split metal rings provided with corrugated sides, the groove of at least one of said rings being provided with a series of indentations said indentations forming spaced ridges in the opposite side of the ring which prevent full lateral contact with an adjoining ring of said packing whereby passageways are formed in the body of the packing extending radially between the wall of said cylinder and the bottom of the recess in the piston.

3. For use in a recessed reciprocating piston mounted in a cylinder, a packing comprising a plurality of superimposed split metal rings, one at least of said rings being provided with a series of indentations, said indentations being annularly spaced in the side of the ring and forming ridges therein.

4. For use in the recess of a reciprocating piston, a packing comprising a plurality of axially and radially expansible metal rings, divided at one point, said rings being provided with an annularly extending tongue and groove joint at the point of division the sides of said groove overlapping the tongue in a radial direction, said tongue being formed to expand radially when compressed axially.

5. In combination with a recessed piston, a packing comprising a plurality of axially and radially expansible rings, said rings being divided at one point and provided with an annularly extending tongue and groove joint at the point of division, said tongue being annularly corrugated and overlapped in a radial direction by the sides of said groove, and being overlapped in an axial direction by the side of an adjoining ring, substantially as described.

6. In combination with a pin, a packing comprising a plurality of axially and radially expansible superposed split rings having inner and outer lands diverging from a grooved medial portion, each of said rings being provided with a pair of slots, and each of said slots being annularly spaced at substantially 45 degrees from the joints of the rings, and at substantially 90 degrees from each other, and being disposed in said grooved medial portions, said rings being arranged with the joints of adjoining rings annularly spaced from each other at substantially right angles, and said pin being disposed in a slot of each ring to maintain the spaced arrangement of said joints, substantially as described.

7. For use with a recessed piston, a packing comprising in grouped arrangement a plurality of relatively thin axially and radially expansible split rings having annularly ridged and grooved sides, said rings being superimposed with ridges and grooves of adjoining rings within a group complementary and in substantially full lateral contact, whereby said adjoining rings within said group have supplementary radial expansion.

8. For use in the recess of a piston, a packing comprising a plurality of thin axially and radially expansible rings in grouped arrangement, said rings being provided with complementary ridges and grooves, and being superimposed with the gaps of adjoining rings spaced at substantially right angles, and said complementary ridges and grooves being in lateral contact, whereby the radial expansion of the group is substantially uniform.

9. A packing comprising in grouped arrangement a plurality of axially and radially expansible rings arranged to form an annular channel, said rings being divided at one point, and the ends of said rings at the point of division being provided with annularly extending tongues, said tongues overlapping in a radial direction, and being overlapped in an axial direction by the side of an adjoining ring of the group, substantially as described.

10. For use in the packing ring recess of a reciprocating piston mounted in a cylinder, a packing comprising a plurality of superposed relatively thin axially and radially expansible resilient metal split rings, said rings having sides provided with one or more continuous annularly extending corrugations, and being formed and arranged to make edgewise contact on the wall of the cylinder upon insertion of the piston therein, substantially as described.

11. A packing comprising in grouped arrangement a plurality of relatively thin resilient metal split rings provided with one or more continuous annularly extending corrugations, and superposed with the ridges and grooves of the corrugations of adjoining rings within a group complementary, the adjacent sides of said adjoining rings within a group being formed to be of identical contour, whereby the sides of the rings normally tend to be in substantially full lateral contact.

12. A packing comprising a plurality of superposed split rings, one at least of said rings having substantially flat axial faces provided with one or more continuous annularly extending corrugations, said corrugations being constructed and arranged to form ridges in one axial face of the ring, and grooves in the opposite axial face, and being disposed a substantial distance inwardly of the peripheral and inner edges of the ring, whereby the grooved side of the ring presents substantially flat surfaces outwardly of the corrugations.

WILLIAM S. MASON.